United States Patent [19]
Clements et al.

[11] 3,915,894
[45] Oct. 28, 1975

[54] ACTIVATION OF HYDROTREATING CATALYSTS

[75] Inventors: Porter Clements, Whiting, Ind.; Oliver L. Davies, Tinley Park, Ill.

[73] Assignee: Nalco Chemical Company, Oak Brook, Ill.

[22] Filed: Feb. 1, 1974

[21] Appl. No.: 438,905

Related U.S. Application Data

[63] Continuation-in-part of Ser. No. 191,810, Oct. 22, 1971, abandoned.

[52] U.S. Cl. ............ 252/439; 208/216; 208/254 H
[51] Int. Cl.² ................. B01J 23/88; B01J 23/84; C10G 23/04
[58] Field of Search ........... 252/439, 414; 208/216, 208/143, 254 H

[56] References Cited
UNITED STATES PATENTS

| | | | |
|---|---|---|---|
| 3,477,963 | 11/1969 | Venrooy | 252/439 |
| 3,481,862 | 12/1969 | Davis, Jr. et al. | 208/143 |
| 3,516,926 | 6/1970 | Davis, Jr. et al. | 208/143 |
| 3,644,433 | 2/1972 | Bichard et al. | 252/439 |

*Primary Examiner*—Winston A. Douglas
*Assistant Examiner*—P. E. Konopka
*Attorney, Agent, or Firm*—John G. Premo; John S. Roberts

[57] ABSTRACT

A stagewise process for presulfiding a catalyst bed in a reactor useful for hydrotreating fuel stocks which comprises:

a. heating the catalyst bed to a temperature of about 350°–450°F. and purging said bed with a nonreducing gas selected from an inert gas and dry steam for about 2 hours while holding the temperature at 350°–450°F.;

b. adjusting the pressure in the bed to about 150–250 psig and filling the bed and reactor with liquid feedstock preheated to 400°F. containing $CS_2$ added in the amount of about 1.3–6.3 lbs/bbl oil based on sulfur;

c. recycling the oil and maintaining the $CS_2$ concentration by regular addition of $CS_2$ for about 1–3 hours, utilizing a circulating volume of about 2–5 LHSV;

d. upwardly adjusting the temperature of the catalyst bed to about 600°F. in about 1.5–2.0 hours without $CS_2$ addition and concurrently treating with hydrogen under recycle at about 800–1500 scfb and at about 150–550 psig;

e. completing presulfiding on stream by treating the catalyst bed with liquid feedstock at about 1–2 LHSV for about 8–16 hours, utilizing hydrogen recycle at about 1000 scfb.

Optionally, the hydrogen in (d) and (e) may be added by a procedure other than recycle.

6 Claims, No Drawings

ACTIVATION OF HYDROTREATING CATALYSTS

This is a continuation-in-part of pending Ser. No. 191,810, filed Oct. 22, 1971, Porter Clements and Oliver Davies, entitled "Activation of Hydrotreating Catalysts", now abandoned. The present invention relates to a method for presulfiding catalysts used in hydrotreating and especially in hydrodesulfurization and hydrodenitrogenation of petroleum fractions or fuel stocks. It is particularly adapted to the activation of nickel molybdate and cobalt molybdate catalysts by a presulfiding technique which results in increased catalyst activity when later used in hydrotreating processes.

In the refining of petroleum fractions, objectionable quantities of naturally occurring sulfur and nitrogen compounds must be removed in early stages usually by catalytic treatment. Such fractions may contain up to 4% by weight sulfur and up to 0.7% by weight nitrogen, and for useful fraction recovery it is desirable to substantially reduce the concentrations of these detrimental constituents.

In the prior art, catalytic removal of sulfur and nitrogen has been usually accomplished by contacting a mixture of petroleum fraction and hydrogen with a quantity of catalytic agent at elevated temperatures and pressures. Temperatures on the order of 350°–750°F. and pressures of about 150–1000 psig represent operating ranges for this type of processing which is commonly referred to as hydrotreating. The sulfur and nitrogen present are converted in the main to hydrogen sulfide and ammonia, respectively, which are then separated from the treated hydrocarbon stream.

It has been further found that conventional hydrotreating catalysts containing an active metal of Group VI $b$ and VIII, such as cobalt, nickel, and molybdenum, on a support such as alumina, silica, or silica-alumina may be made more effective by a process known as presulfiding prior to the use of the catalyst in the hydrotreating operation. In other words, it is known that higher activity for catalytic conversion of sulfur and nitrogen compounds is obtained when the active metal components are at least partially in the form of sulfides. Although these metals become sulfided gradually by contact with the sulfur containing feedstock under typical desulfurization and denitrogenation processing conditions, the period of days necessary to attain maximum catalytic activity may be substantial and is economically unfeasible. Therefore, it has become common in practice to sulfide or preactivate the catalyst by contacting the catalyst, usually in fixed or bed form, with a gas stream containing a sulfiding agent such as hydrogen sulfide. However, the ensuing sulfiding reactions are highly exothermic, leading to hotspots in the catalyst with resultant damage. In order to obviate the difficulties due to excessive heating of the catalyst and the resultant undesirable change in the catalyst physical and chemical state, it is a part of the emphasis of this invention to moderate the temperature changes in the presence of a regulated additive by providing a liquid petroleum hydrocarbon phase which absorbs the heat produced and prevents thermal damage likely to occur in the above dry type presulfiding. The present invention also contemplates the addition of carbon disulfide in regulated amount during initial wetting of the catalyst to accomplish preadsorption of the $CS_2$ additive.

The generalized process is known and the prior art is exemplified by the following U.S. Pat. Nos.:

3,477,963 Venrooy (Sun)

The thrust of this patent is where an organo sulfide is first passed over a presulfided metal sulfide catalyst before passing over the metal composition to be sulfided and the teachings by example show the concurrent use of the sulfurizing agent and hydrogen for treatment. Variations in the treating technique are disclosed at column 1, lines 56–63.

3,481,862 Davis (Sun)

This patent utilizes a high pressure of at least 500 psig and distinctly disclaims a hydrogen gas bleed or recycle. The present invention is limited to an upward pressure parameter of 250 psig in preadsorption.

3,516,926 Davis (Sun)

Similar to Davis '862 above where the treating pressure has been decreased to 400 psig and like '862 the patent concurrently uses hydrogen and carbon disulfide in the treatment.

The present invention is a stagewise process summarized as follows. The process for presulfiding a catalyst bed in a reactor useful for hydrotreating fuel stocks which comprises:

a. heating the catalyst bed to a temperature of about 350°–450°F. and purging said bed with a nonreducing gas selected from an inert gas and dry steam for about 2 hours;

b. adjusting the pressure in the bed to about 150–250 psig and filling the bed and reactor with liquid feedstock pre-heated to 400°F. containing $CS_2$ added in the amount of about 1.3–6.3 lbs/bbl oil based on sulfur;

c. recycling the oil and maintaining the $CS_2$ concentration by regular addition of $CS_2$ for about 1–3 hours, utilizing a circulating volume of about 2–5 LHSV;

d. upwardly adjusting the temperature of the catalyst bed to about 600°F. in about 1.5–2.0 hours without $CS_2$ addition and concurrently treating with hydrogen under recycle at about 800–1500 scfb and at about 150–550 psig;

e. completing presulfiding on stream by treating the catalyst bed with liquid feedstock at about 1–2 LHSV for about 8–16 hours, utilizing hydrogen recycle at about 1000 scfb.

Optionally, the hydrogen in (d) and (e) may be added by a procedure other than recycle.

In the above process considerable energy saving is achieved by withholding of hydrogen during steps (a)–(c) and it has been found that a distinct time saving on presulfiding has resulted.

The feedstock or hydrocarbon fraction utilized is preferably one which boils in the range of about 400°–650°F. and has a sulfur content of from 0.2% to 2.0% by weight. A preferred sulfur content is from about 0.5 to 1.5%. The additive organic sulfur compound or sulfurizing additive is preferably carbon disulfide. Other utilizable compounds may be low molecular weight mercaptans, sulfides, or disulfides. Such compounds are known in the art and are described as, for example, in U.S. Pat. No. 3,477,963 Venrooy at column 2, lines 37–53. The additive concentration may be in the range of 1.3 lbs. of sulfur to 6.3 lbs. of sulfur/bbl oil, and a preferred concentration for the additive is represented by a solution containing 1.85 lbs. carbon disulfide/bbl oil (1.55 lbs. based on sulfur).

In a generalized procedure consonant with the present invention, a catalyst to be presulfided is charged to a catalytic reactor to form a bed of catalytic particles. The reactor and its contents are heated to about 350°–450°F. (preferred about 400°F.) and purged with nitrogen, inert gas, or dry steam for about 1–2 hours. The presulfiding oil containing additive, preheated to catalyst bed temperature, is pumped into the reactor to completely soak the catalyst particles, and preferably the reactor and catalyst free space are filled with the solution. Concurrently the reactor is brought up to and maintained at a pressure of 150–250 psig, desirably 200 psig, for a period of about 1–3 hours. The presulfiding oil, containing sulfur additive, is pumped through the catalyst at a rate of 2–5 vol oil/hr/vol catalyst (2–5 LHSV) preferably at 4 vol/hr/vol for preferably 2 hours to obtain preadsorption of sulfur on the catalyst. During this period the sulfur additive is maintained at the original level by continuous or intermittent addition of the sulfur compound to the reactor and the $CS_2$ containing oil is maintained under recycle also at a circulating volume of about 2–5 LHSV and preferably for about 1–3 hours, a preferred oil rate being about 4 LHSV for about 2 hours.

After the preadsorption stage above, where it is believed about 85% of the sulfiding takes place, the final presulfiding reactions are brought in to play by discontinuing the flow of additive, reducing the oil return to about 2 vol/hr/vol and concurrently raising the catalyst bed temperature to about 600°F. Also, at this time, hydrogen is admitted in a gas stream containing at least 70% by volume hydrogen. Such hydrogen may be obtained as a gaseous effluent from a water gas converter or catalytic reformer and the hydrogen flow is maintained at a rate of about 800–1500 scf/bbl oil and preferably about 1000 scf/bbl. The unconsumed hydrogen from this process may be recycled during the presulfiding period. The increase in catalytic bed temperature is regulated so that the increase from 400°F. to the desired temperature of about 600°F. (range 550°–625°F.) is accomplished in not less than 1–½ to 2 hours. When the catalyst temperature is under steady control after about 2 hours and at about 600°F., the final catalyst conditioning is completed by continuing oil and hydrogen flow for 8–16 hours using hydrogen at about 1000 scf/bbl. The pressure conditions utilized in the final presulfiding reactions where hydrogen is added in the process may be increased from the preadsorption range to values of 150–550 psig where the pressure utilized is governed by the type of feedstock treated.

Also, in this process where hydrogen is added in the final presulfiding, hydrogen may be added directly for small scale operations or recycled from down stream in larger plant operations.

In this last step of the process where sulfur additive is withheld, it has been found that the feedstock or hydrocarbon fraction utilized may be a so-called sulfur feedstock or a sulfur-free feedstock so that for practical purposes $CS_2$ or its equivalent is withheld during the final presulfiding reactions in this process. It has further been found that the use of low sulfur oil, where the sulfur content was about ⅛ in comparison, has resulted in greater activity in the finished catalyst.

EXAMPLE 1

The protocol of this process, ante at pages 3–4, was utilized in the following example and the temperature in pre-adsorption step (a) was 400°F., the inert gas was nitrogen, the pressure was 200 psig, and the additive utilized was $CS_2$ in the amount of 1.85 lbs/bbl oil. This concentration of $CS_2$ was maintained in the oil in step (c) for 1 hour and the oil rate was 4 LHSV. For final presulfiding, the temperature was upwardly adjusted to 600°F. in step (d) for a period of 2 hours. Hydrogen addition was made at a rate of 1500 scfb holding a pressure at 450 psig. The feedstock utilized during hydrogen treatment withheld $CS_2$ and the feedstock rate was maintained at 2 LHSV. In completing the presulfiding on stream, the feedstock was utilized at a rate of 2 LHSV for 8 hours and hydrogen was utilized at 1000 scfb. The catalyst utilized was virgin nickel molybdate in 100 cc samples. For catalyst activity a comparison test was made against the procedure of U.S. Pat. No. 3,477,963 Venrooy, ante, as follows:

1. U.S. Pat. No. 3,477,963 Venrooy (Example II) — single bed The procedure of this example was followed except that the amount of reactants were doubled including nickel molybdate catalyst charge amount and treat gas rates in order to obtain sufficient material (100 cc) for activity testing.
2. U.S. Pat. No. 3,477,963 Venrooy (Example III) — double bed In this case the initially prepared material for the upper bed was prepared by sulfiding nickel molybdate catalyst according to Example I of this patent. This material was charged on top of an unsulfided nickel molybdate and the procedure of Example III of the patent was followed. After sulfiding, the lower bed (100 cc) was retained for activity testing.
3. A third 100 cc sample of nickel molybdate catalyst was charged into a ¾″ I.D. stainless steel reactor and sulfided according to the reaction conditions above in this example.

Samples 1 and 2 above were charged into reactors and kept under nitrogen purge while heating to 400°F. These two reactors were then given the same scheduling as the sample of the present invention with respect to steps (d) and (e). During step (e) the conditions in effect were 600°F.; 450 psig; and LHSV 2.0; 1000 scfb for hydrogen. The three catalyst samples were kept at the same conditions for a 1-hour processing period following the end of step (e). Results were as follows:

Catalyst Desulfurization Activity Evaluation

| Sulfiding Method | Desulfuriization Weight Relative Activity* |
|---|---|
| Sample of present invention | 1.21 |
| Venrooy (Example II) | 0.95 |
| Venrooy (Example III) | 1.00 |

*ratio of desulfurization rate to rate found for Example III catalyst.

EXAMPLE 2

Table I has summarized certain experiments in accordance with this invention, Runs 2, 3, and 4 using nickel and cobalt molybdate wherein both oil and hydrogen recycle were simulted and oil recycle was accomplished by collecting several equal portions of the effluent sequentially, respiking each in turn with $CS_2$ to replace what had been removed by the catalyst. The respiked portions were returned to the oil feed supply vessel. This vessel had been charged initially with a minimum quantity of $CS_2$-oil, sufficient to keep the feed pump supplied between respikings. Hydrogen gas recycle was simulated by feeding hydrogen containing a small quantity of methane from a gas cylinder to the reactor. This mixture represented the recycle gas stream returning to a refinery hydrotreating reactor from the reactor effluent gas scrubber—a unit typically associated with a hydrotreating system. Nickel molybdate catalyst was commercially obtained. Cobalt molybdate catalyst had the same size and shape as the nickel molybdate.

With reference again to Table I, recycling Runs 2, 3, and 4, and especially 2, appeared to give slightly less desulfurization weight relative to the activity than the straight-through run of sample No. 1 reported in Example 1.

the amount of 17 g/gal of carbon disulfide addition for 1 hour at an oil rate of 4 vol/hr/vol.

After the preadsorption step, which included the protocol steps (a)–(c), the addition of $CS_2$ was discontinued and additionally a light cycle oil containing about 1000 ppm basic nitrogen by quinoline addition was introduced to the reactor directly after preadsorption, with changed reactor conditions specifically designed to test activity as follows: 600°F., 3.9 vol oil/hr/vol catalyst, 540 psig pressure, and 1000 scf hydrogen/bbl as 70% hydrogen.

Results are shown below in Table II and these results indicate that a much greater importance, so far as sulfiding is concerned, is attached to the preadsorption stage than to the later treatment, since both nitrogen and sulfur have been reduced to low levels shortly after the end of preadsorption.

Also shown below in Table II end product analyses were made including a separate run which added a 16-hour follow up sulfiding.

TABLE I

| | Presulfiding Method and Catalyst | Oil Used as $CS_2$ Vehicle | Operating Mode for Presulfiding | Feedstock for Activity Test | Desulfurization Weight Relative Activity* |
|---|---|---|---|---|---|
| | This Invention | | | | |
| 1. | Nickel Molybdate | A | no recycle | C | 1.21 |
| 2. | Nickel Molybdate | A | recycle | D | 1.11 |
| 3. | Nickel Molybdate | B | recycle | D | 1.07 |
| 4. | Cobalt Molybdate | A | recycle | D | 1.15 |
| | Venrooy 3,477,963 | | | | |
| 5. | Nickel Molybdate | none | no recycle | C | 0.95 |
| | Example II | | | | |
| 6. | Nickel Molybdate | none | no recycle | C | 1.00 |
| | Example III | | | | |

*Ratio of desulfurization rate to rate found for Example III of Venrooy 3,477,963.

| Oil | API Gravity | Approx. Boiling Range, °F | Weight % Sulfur |
|---|---|---|---|
| A | 22.4 | 500– 750 | 1.90 |
| B | 36.7 | 434– 690 | 1.26 |
| C | 20.4 | 400–1000 | 3.05 |
| D | 20.4 | 400–1000 | 2.91 |

EXAMPLE 3

The protocol or procedure of the present invention, ante, was followed for steps (a)–(d). Step (e) utilizes a 16-hour follow-up treatment using unspiked cycle oil. In addition, in order to test nitrogen activity, a quinoline spiked cycle oil was utilized using the same processing conditions.

Table II, illustrating this example, shows the stable activity achieved for both nitrogen and sulfur removal after a period of 3 ½ hours after the preadsorption treatment.

EXAMPLE 4

Activity Testing for Sulfur and Nitrogen

In this run the catalyst selected and the presulfiding treatment were consonant with the protocol, ante, and were as follows. The catalyst utilized was a commercial nickel molybdate catalyst. The catalyst bed was heated to about 400°F. and purged with dry steam for about 2 hours. The pressure in the bed was adjusted to about 200 psig and the bed and reactor were filled with feedstock preheated to 400°F. and containing $CS_2$ added in

TABLE II

Product Analyses

| Hours After Preadsorption | Example 4 Basic N, ppm | %S | Example 4 plus 16 hours Follow-up Sulfiding Basic N, ppm | %S |
|---|---|---|---|---|
| 3½ | 371 | 0.09 | — | — |
| 19½ | — | — | (End 16-hour period. (Begin activity test (conditions. | |
| 22 | 385 | 0.09 | 400 | 0.09 |
| Feedstock Analysis | 990 | 0.75 | 990 | 0.75 |

We claim:
1. A stagewise process for presulfiding a catalyst bed wherein the catalyst contains an oxide of an active metal of Group VI *b* and VIII selected from the subgroup consiting of cobalt, and nickel in a reactor useful for hydrotreating fuel stocks which comprises:
 a. bringing the catalyst bed to a temperature of 350°–450°F. and purging said bed with a nonreducing gas selected from an inert gas and dry steam for about 2 hours while holding the temperature at 350°–450°F.;
 b. adjusting the pressure in the bed to about 150–250 psig and filling the bed and reactor with liquid hydrocarbon feedstock preheated to 400°F. containing $CS_2$ added in the amount of about 1.3–6.3 lbs/bbl oil based on sulfur;
 c. recycling the oil and maintaining the $CS_2$ concentration by regular addition of $CS_2$ for about 1–3 hours utilizing a circulating volume of about 2-5 LHSV:
d. wherein stages (a), (b), and (c) are carried out in the absence of $H_2$;
e. upwardly adjusting the temperature of catalyst bed containing liquid hydrocarbon feedstock to about 600°F. for about 1.5-2.0 hours minus $CS_2$ addition and concurrently treating with hydrogen at about 800-1500 scf/bbl and at about 150-550 psig;
f. completing on stream presulfiding by flowing liquid hydrocarbon feedstock at about 1-2 LHSV for about 8-16 hours and concurrently using hydrogen at about 1000 scf/bbl.

2. The process of claim 1 wherein the amount of $CS_2$ is about 1.85 lbs/bbl oil.

3. The process of claim 1 wherein the $CS_2$ containing oil is circulated at about 4 LHSV for about 2 hours.

4. in claim 1 where the catalyst is nickel molybdate.

5. In claim 1 where the catalyst is cobalt molybdate.

6. A stage-wise process according to claim 1 wherein in steps (e) and (f) the hydrogen is utilized under recycle.

* * * * *